United States Patent [19]

Jessee et al.

[11] Patent Number: 5,733,079
[45] Date of Patent: Mar. 31, 1998

[54] SURFACE DETERMINATION AND AUTOMATIC MILLING IN SPINNERETTE MANUFACTURING

[75] Inventors: Ernest Edward Jessee; Michael Ray McLaughlin; Timothy Martin Pinto, all of Kingsport; James Emmett Grant, Jr., Johnson City, all of Tenn.

[73] Assignee: Eastman Chemical Company, Kingsport, Tenn.

[21] Appl. No.: 572,939

[22] Filed: Dec. 15, 1995

[51] Int. Cl.⁶ ............................................. B23Q 17/20
[52] U.S. Cl. .................. 409/79; 364/474.02; 364/474.31; 409/117
[58] Field of Search .................. 409/79, 117, 123, 409/133, 139, 183, 80, 188; 364/474.02, 474.28, 474.31, 474.37

[56] References Cited

U.S. PATENT DOCUMENTS

| 2,730,175 | 1/1956 | Piperoux et al. ............... 164/87 |
| 3,338,085 | 8/1967 | Hartley et al. ............... 408/12 |
| 3,362,265 | 1/1968 | Thompson et al. ............ 76/107 |
| 3,969,615 | 7/1976 | Bowers ....................... 364/474.31 |
| 4,355,447 | 10/1982 | Di Matteo .................... 409/84 |
| 4,976,019 | 12/1990 | Kitamura ..................... 409/133 |

FOREIGN PATENT DOCUMENTS

| 3643713 | 6/1988 | Germany ................... 364/474.31 |
| 24814 | 2/1980 | Japan ........................ 409/133 |
| 278747 | 11/1988 | Japan ........................ 409/98 |
| 240260 | 9/1989 | Japan ........................ 364/474.37 |

*Primary Examiner*—Daniel W. Howell
*Attorney, Agent, or Firm*—Charles R. Martin; Harry J. Gwinnell

[57] ABSTRACT

A numerically controlled milling machine is used to mill the surface of a coined spinnerette after punching and before broaching the holes in the spinnerette. A probe is mounted on the milling machine to obtain data points on the bumpy surface of the coined spinnerette. The low points in predetermined areas off of the protuberances on the bumpy surface of the coined spinnerette are detected. Splines connecting the low points in, e.g., concentric rings if the holes in the finished spinnerette will be in rings, are used to generate a representation of the finished surface. A spiral tool path is obtained using the representation of the finished surface and G-codes are generated to control the milling machine to move a tool along the tool path. After the coined spinnerette has been milled, conventional finishing, including broaching is performed.

5 Claims, 7 Drawing Sheets

SURFACE DETERMINATION AND AUTOMATIC MILLING IN SPINNERETTE MANUFACTURING

BACKGROUND OF THE INVENTION

Field of the Invention

The present invention relates to the production of filaments from synthetic polymers and, more particularly, to the fabrication of spinnerette plates through which the filaments are spun.

Description of the Related Art

The manufacture of synthetic fibers involves the extrusion of polymers, either molten polymers in "melt" spinning, or a polymer solution in "solvent" or "dry" spinning, through a large number of extremely small holes in metal plates. For solvent spinning the hole is typically 30–70 µm across the widest part of the hole. The spinnerette must be relatively thick due to the high viscosity of the polymer solution and the desire for production speeds as high as possible. At the same time, it is desirable that the internal shape and dimensions of all of the holes in the spinnerette have as little variance as possible to produce the highest quality fiber possible. It is also preferable that each spinnerette can be used to produce as wide a range of fiber sizes as possible by modifying other conditions in the fiber production process. Due to the size of such spinnerettes, typically between about 4 and 8 cm in diameter and about 1 to 2 mm thick. It is difficult to obtain spinnerettes with hundreds of precisely shaped holes using conventional techniques.

The conventional method of manufacturing spinnerettes is well known. Examples of methods for manufacturing spinnerettes (also spelled spinnerets and also referred to as jets) are disclosed in U.S. Pat. Nos. 3,362,265; 3,338,085; and 2,730,175. As disclosed in the '265 patent, one or more punching steps are typically performed which result in what will be termed a coined spinnerette. A coined spinnerette typically contains between 40 and 600 protuberances on the side of the spinnerette opposite the punch. These protuberances are ground off and then the final shape of the capillary portion of the hole is formed by a broach. To enable the broach to be properly centered in the hole, the grinding step preferably does not open the hole, so that the broach can be centered using the marks left by a previous punch. Conventional punching machines are able to prevent broaching of the hole during the initial punching step(s). However, the resulting "bumpy" surface of the coined spinnerette opposite the surface on which the punch machinery operates is deformed by the punching process producing a relatively uneven surface on a very small scale, e.g., with variations in the bases of the protuberances in the range of 0.025 mm to 0.100 mm. As a result, it is difficult to grind the coined spinnerette to obtain a consistent thickness of the metal at the bottom of each indentation.

Conventionally, the metal protuberances are ground manually using a belt sander. Manually grinding the non-uniform face of a spinnerette requires great dexterity, experience and patience. The process can crudely be described as grind, visually inspect, turn the spinnerette, and repeat. All during this grinding, the metal becomes hotter and hotter. An experienced operator can grind a spinnerette having a large number of holes, e.g., 500 holes, in 45 minutes to an hour. Despite heating of the partially formed spinnerette and the other stresses involved in the process, experienced operators are able to maintain a tolerance-of about ±25 µm in the remaining thickness of the metal at the bottom of each indentation. It is desirable to reduce this variation to improve the consistency in the size of the spinnerette holes. Previous attempts to automate the process have not led to a significant reduction in the variation of metal thickness.

SUMMARY OF THE INVENTION

It is an object of the present invention to provide a spinnerette capable of producing high quality synthetic fibers.

It is another object of the present invention to provide a spinnerette capable of producing fibers with different characteristics.

It is also an object of the present invention to provide a spinnerette with holes having dimensions with capillary transition length variance as low as ±15 µm.

The above objects are accomplished by providing a method of manufacturing spinnerettes, including the steps of detecting low points of a bumpy surface of a coined spinnerette; generating a representation of a finished surface of the coined spinnerette by interpolating between the low points; milling the bumpy surface of the coined spinnerette based on the representation of the finished surface of the coined spinnerette; and finishing the coined spinnerette.

A spinnerette blank undergoes a conventional punching process to produce the coined spinnerette. Then an optical probe is preferably moved over the bumpy surface of the coined spinnerette by a milling machine to detect the coordinates of the bumpy surface of the spinnerette. Next, low points within predefined areas of the bumpy surface are found. The predefined areas are selected based on the pattern of protuberances on the bumpy surface of the coined spinnerette. For example, the predefined areas for a spinnerette with protuberances in a pattern of concentric rings may be rings of small circular areas arranged in rings having each having a radius slightly larger than a corresponding ring of protuberances, with extra rings of areas, one inside the protuberance ring with the smallest radius and another outside the ring of areas adjacent to the protuberance ring with the largest radius.

The lowest points within each of the predefined areas are preferably used for three-dimensional curve fitting to produce splines characterizing the finished surface which is desired. For a spinnerette with concentric protuberance rings, the splines are preferably substantially concentric (although not quite planar). A representation of the finished surface can be obtained from the splines using a conventional computer-aided manufacturing program which is also capable of producing commands for a milling machine to mill the finished surface on the coined spinnerette.

The same milling machine used to detect the surface of the coined spinnerette is preferably used to execute the commands obtained from the representation of the finished surface of the coined spinnerette after a tool is mounted in place of the optical probe. The spinnerette is then finished by broaching the remaining metal at the bottom of each indentation and performing any other conventional operations, such as polishing.

The above objects together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

In the Description of the Preferred Embodiments presented below, reference is made to the accompanying drawings, in which.

DESCRIPTION OF THE PREFERRED EMBODIMENTS

Manufacturing of a spinnerette starts with a spinnerette blank shaped in the form of a flat thimble by a conventional process, .such as a die stamping process. An example of a spinnerette 10 is illustrated in cross-section in FIG. 1. The remainder of FIG. 1 will be described later. As described above, conventional punching step(s) are performed to form indentations on the underside (as viewed in FIG. 1) of the spinnerette 10. This produces protuberances on the "upper" surface of the spinnerette 10. These surfaces will be referred to respectively as the indented surface and bumpy surface of a coined spinnerette.

Figure 1:
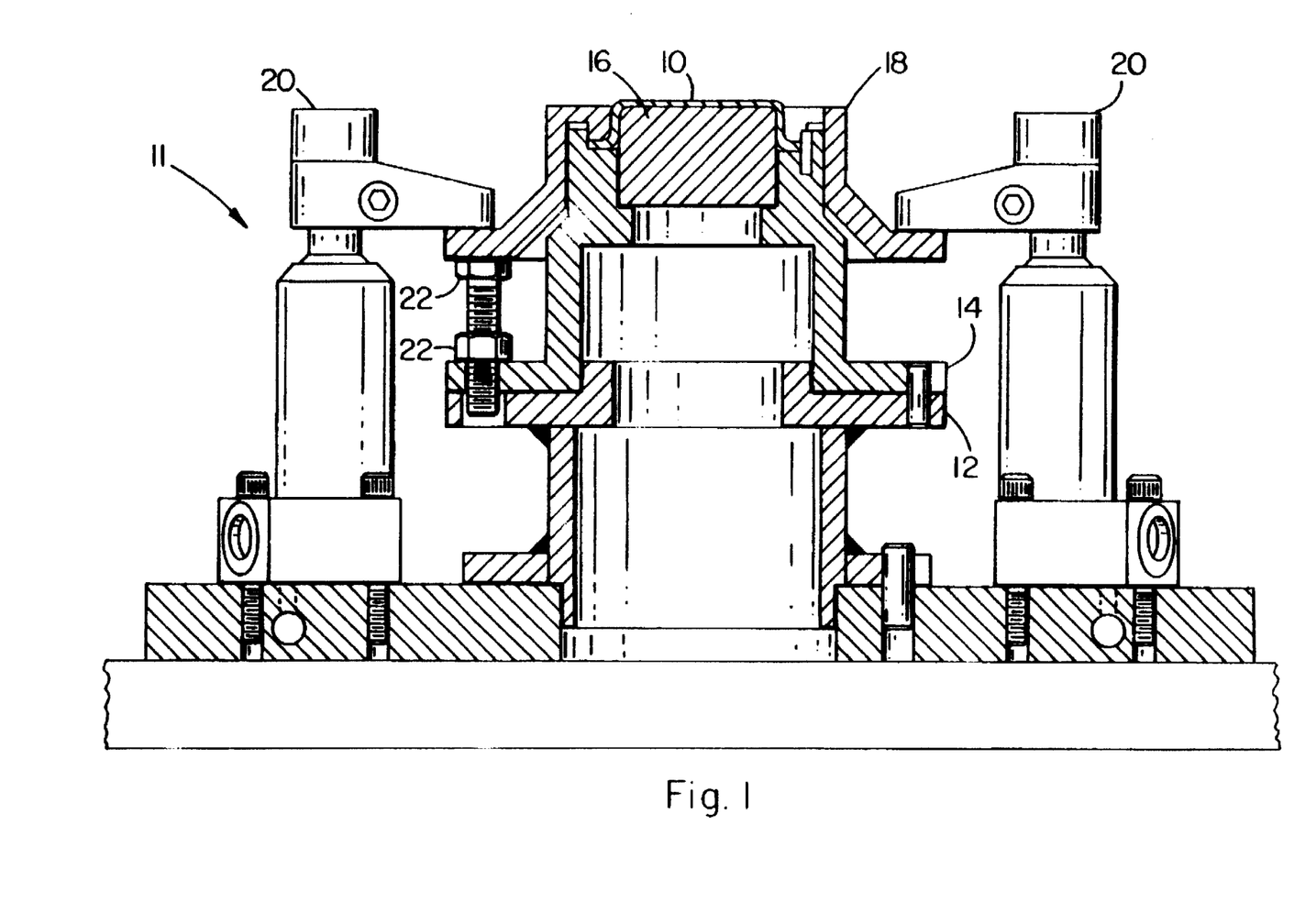
FIG. 1 is a partial cross-sectional view of a fixture for supporting a coined spinnerette for surface detection and milling.

According to the preferred embodiment, the protuberances on the bumpy surface of the coined spinnerette are milled off using a milling machine, such as a Fadal VMC 40 from Fadal Engineering, Chatsworth, Calif., or a similar computer numerically controlled (CNC) and preferably direct numerically controlled (DNC) milling machine. To ensure that the coined spinnerette does not move during the milling process, the coined spinnerette 10 is preferably mounted on a fixture 11, as illustrated in FIG. 1. The fixture 11 illustrated in FIG. 1 has a base 12 for spinnerettes with an overall diameter of 50 to 100 mm. An adapter 14 may be provided for spinnerettes of other sizes, such as the 50 mm spinnerette 10 illustrated in FIG. 1. Interchangeable blocks 16 are used to obtain a close fit for spinnerettes with the same size, but different patterns which cause different gross variations in the shape of the coined spinnerette. Preferably, there is a slight crown or raised center on the top of the interchangeable block 16. The spinnerette 10 is placed on top of the interchangeable block 16 and locked into place by a ring 18. In the preferred embodiment, this is accomplished by pneumatic fingers 20 mounted on the base 12. Movement of the ring 18 is stopped by, e.g., bolts 22, one of which is illustrated in FIG. 1.

As the spinnerette 10 is locked into place by the ring 18, the raised crown of the interchangeable block 16 causes the spinnerette to be slightly deformed and contact the interchangeable block 16 on all portions of the indented surface that are not indented as a result of the punching step(s). As a result, the pressure on the spinnerette 10 during the subsequent milling step will not cause deflection of the spinnerette 10.

Figure 2:
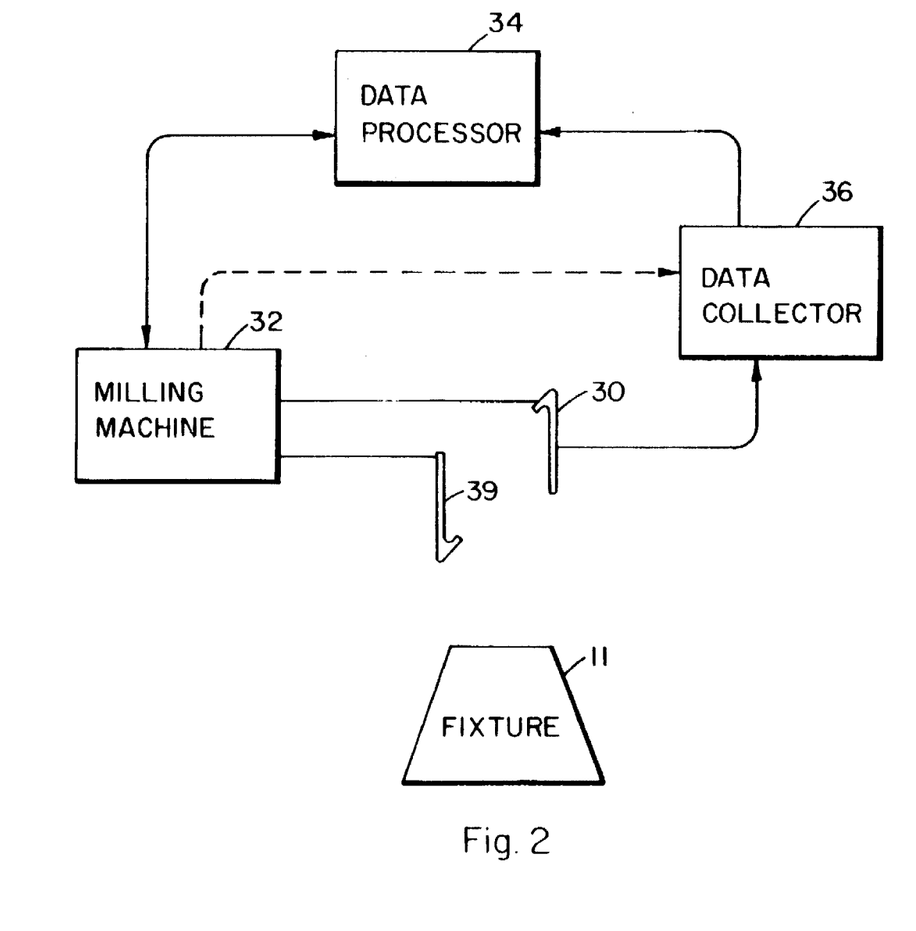
FIG. 2 is a block diagram of an apparatus for manufacturing spinnerettes according to the present invention.
Figure 3:
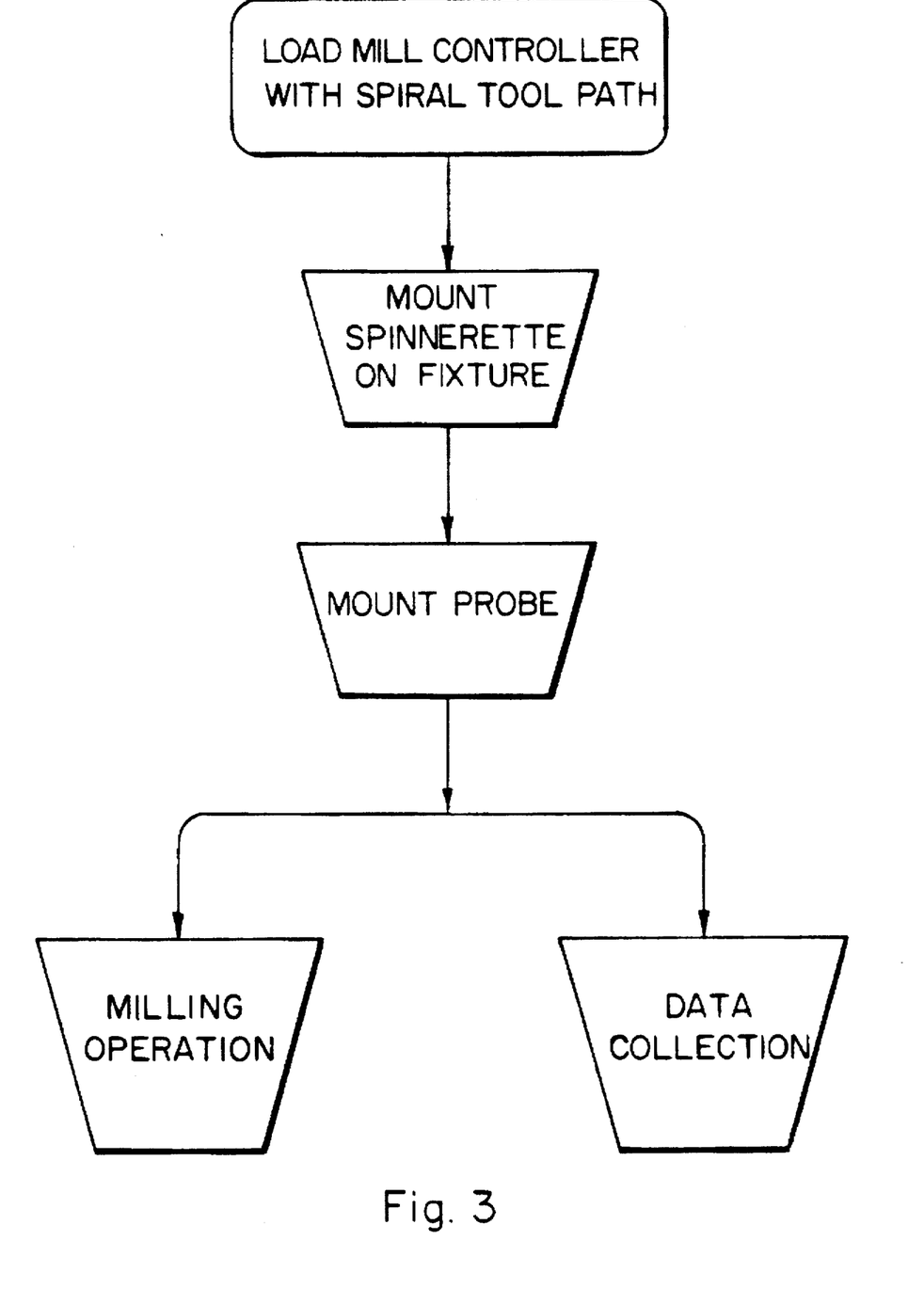
FIGS. 3, 4, 5 and 7 are flowcharts of a method according to the present invention.

The apparatus illustrated in FIG. 2 is used to mill the protuberances off of the spinnerette by performing the steps in FIGS. 3–5 and 7. First, the coined spinnerette 10 fixed in place, as indicated in step 28 of FIG. 3. A probe 30, preferably a laser probe, such as a UBM Telefocus Sensor, Part No. 1083 from UBM Corporation, Roselle, N.J., which has a 1 μm spot at a working distance of ±300 μm, is mounted 31 on a milling machine 32. A laser probe is preferred, so that a simple spiral pattern may be used 33 for any spinnerette of the same size, regardless of the pattern of protuberances. If a mechanical probe is used, probe movement patterns are stored matching the hole patterns of the spinnerettes to ensure that the probe makes contact in the "valleys" on the bumpy surface of the coined spinnerette, between the protuberances.

In the preferred embodiment, a data processing system 34 or other program storage system for the milling machine 32 stores programs for moving 37 the probe 30 over different size spinnerettes. The coordinates detected by the probe 30 are transferred by a data collector 36 to the data processing system 34. The data collector 36 may be any conventional device which stores 38 data as the data are generated and then subsequently transfers the file to the data processor 34, or the data collector 36 may be an interface which connects the probe 30 directly to the data processing system 34.

As indicated by the dashed line connecting data collector 36 and milling machine 32, the x, y and z coordinates of the probe 30 are typically supplied by the milling machine 32, while the distance from the mount for the probe 30 to the surface of the spinnerette 10 is supplied by the probe 30. The accuracy of the coordinate data from the milling machine during the detection step and the subsequent milling step is of critical importance. Therefore, load mounted encoders (not separately shown), particularly glass scale encoders, are preferably used, such as Part Number AT21C-529-567 produced by Mitatoyo, Paramus, N.J. or Model No. LS704C produced by Heidenhain Corporation, Schaumburg, Ill. If the data collector 36 does not record the data obtained from the probe 30, but simply passes the data on to the data processing system 34, the position data provided by the encoders may similarly be supplied directly to the data processing system 34, as indicated by the arrowhead pointing to the data processing system 34 on the solid line connecting the data processing system 34 and the milling machine 32.

The Fadal VMC 40 is typical of DNC and CNC milling machines in that it includes numerically controlled motors for moving and powering tools 39 or probes 30 and means for mounting such devices, together with a controller. However, unlike most milling machines available in the U.S.A. of comparable size, the Fadal VMC 40 can be purchased with load-mounted encoders as standard equipment, which are highly desirable when working with small workpieces. In the description below and as illustrated in FIG. 2, references to the milling machine 32 generally includes the controller and the load mounted encoders which may be obtained separately from a basic milling machine.

In the remaining description of the invention, an example of a spinnerette will be used which is 50 to 100 mm in diameter with holes to be formed between 6 mm and 48 mm from the center of the spinnerette. This spinnerette will be machined to form almost 500 holes. Like all spinnerettes manufactured according to the present invention, this spinnerette preferably includes an alignment notch or other conventional indicator for precisely aligning the coined spinnerette 10 on the fixture 11. In this example, the laser probe 30 will be moved in a spiral path with a starting radius of 6 mm and an ending radius of 48 mm to completely cover the area of the spinnerette on which protuberances are located. Using the apparatus described above will produce coordinates for approximately 75,000 points on the spinnerette.

To reduce the amount of processing performed by the data processing system 34 and enable proper milling of the coined spinnerette 10, areas between the bumps where minimum values can be expected are defined for each pattern of holes. For this purpose, sets of data are stored in the data processing system 34 defining predetermined areas adjacent to the holes of the coined spinnerette for each pattern of each size. For example, several hundred circular areas, each having a radius of approximately 0.75 mm may be used for the spinnerette example described above. The data processing system 34 checks all of the points received from the probe 30 and stores the lowest point within each area for subsequent processing.

The pattern of holes on a coined spinnerette 10 is conventionally defined in a program used to control the punching step(s). A machine readable file containing the hole pattern data is supplied to the data processing system 34 to obtain the predetermined areas in which low points will be located. In the spinnerette example described above, the 50 to 100 mm spinnerette will have slightly less than 500 holes which at this point in the manufacture of the spinnerette are protuberances. The protuberances are equally spaced around and centered on concentric circles with a constant pitch between the concentric circles of, e.g., 2.5 mm.

Figure 4:
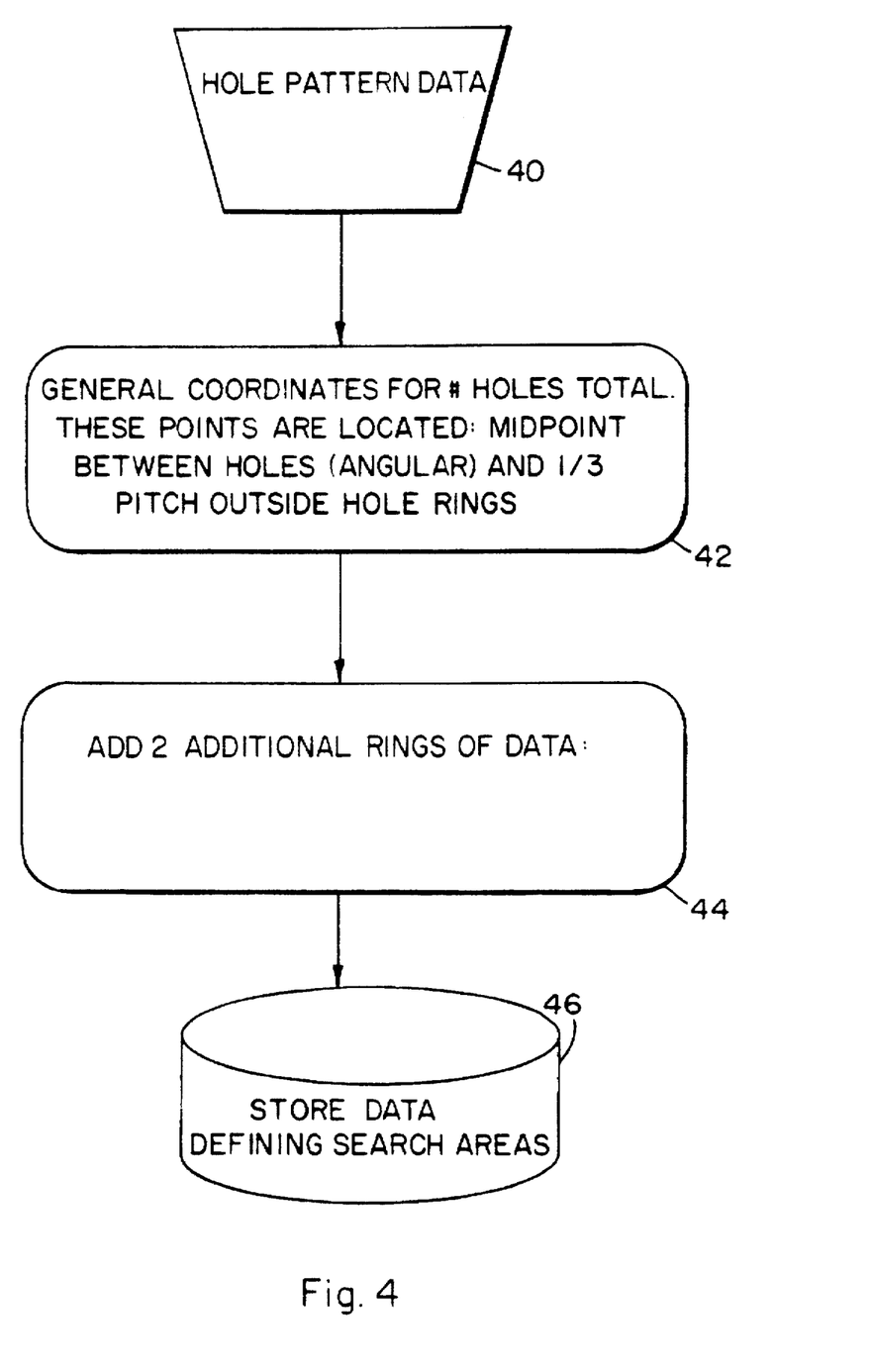

An example of how the hole pattern of the example spinnerette can be used to obtain data defining the predetermined areas is provided in the flowchart illustrated in FIG. 4. The hole pattern is input or read 40 and then coordinates of the centers of the areas are determined 42. When the hole pattern is concentric circles or rings, as in the spinnerette example, the predetermined areas are preferably formed in rings also. Two-dimensional coordinates are used for the rings of predetermined areas, since the third (vertical) dimension is unknown. Therefore, the rings of predetermined areas will be referred to as two-dimensional rings.

For a spinnerette having a hole pattern with n rings, the number of two-dimensional rings is preferably n+2. Of these n+2 rings, n are preferably slightly larger than a corresponding ring of protuberances. For example, the radius of each of these n two-dimensional rings may be larger than the radius of an adjacent protuberance ring by one-third times the constant pitch of the protuberance rings. The centers of the predetermined areas on each of these n rings is positioned so that it is equidistant from the two closest protuberances in the adjacent ring. An additional two-dimensional ring is preferably defined 44 inside the inner-most ring of protuberances, e.g., with a radius smaller than the inner-most protuberance ring by approximately one-third times the constant pitch. The final two-dimensional ring is preferably defined 44 outside the outer-most circle of protuberances with a radius larger than the radius of the closest two-dimensional ring by approximately two-thirds of the constant pitch of the protuberance rings. The data defining the two-dimensional rings are stored 46 in the data processing system 34.

Figure 5:
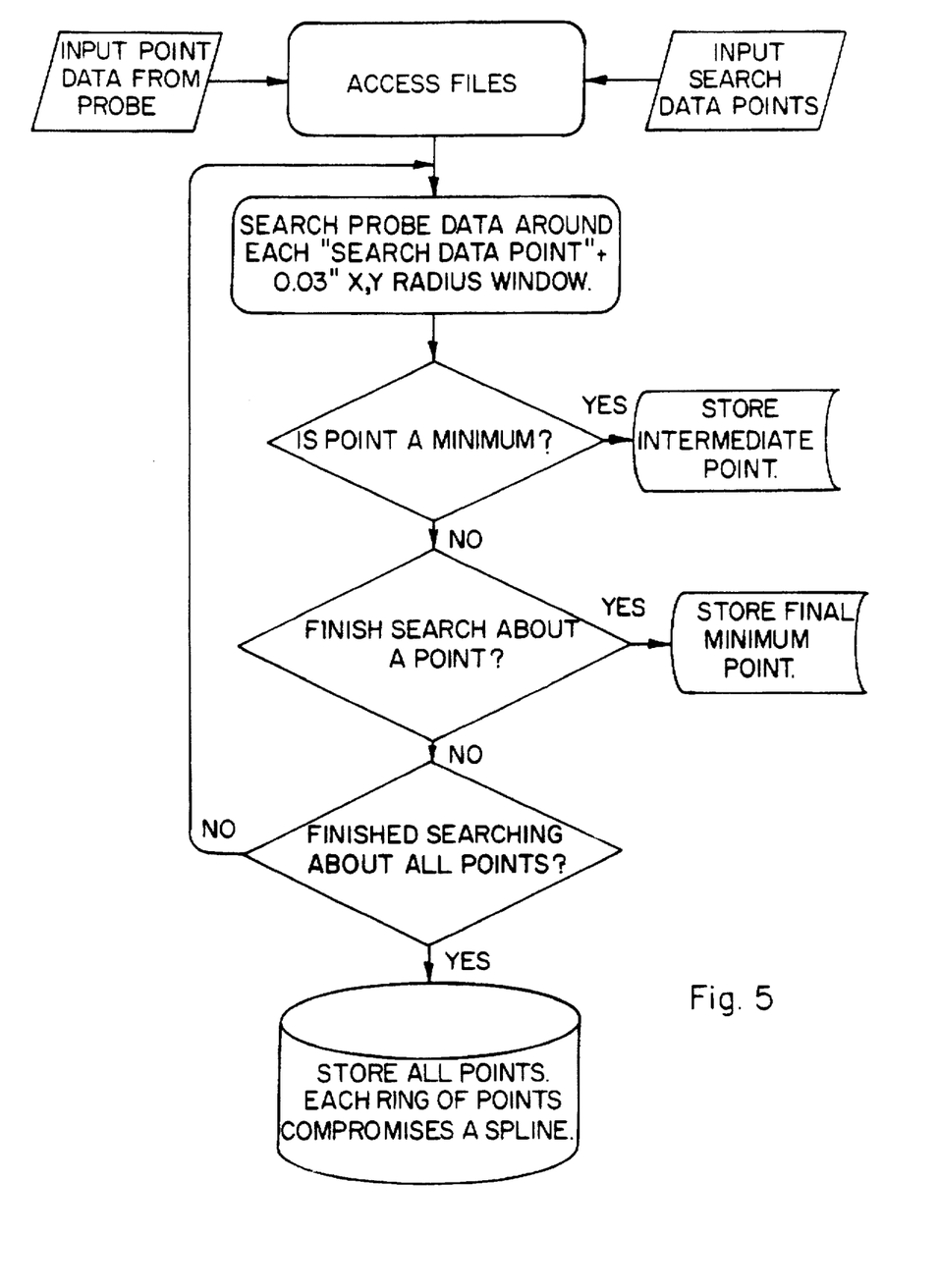
Figure 6:
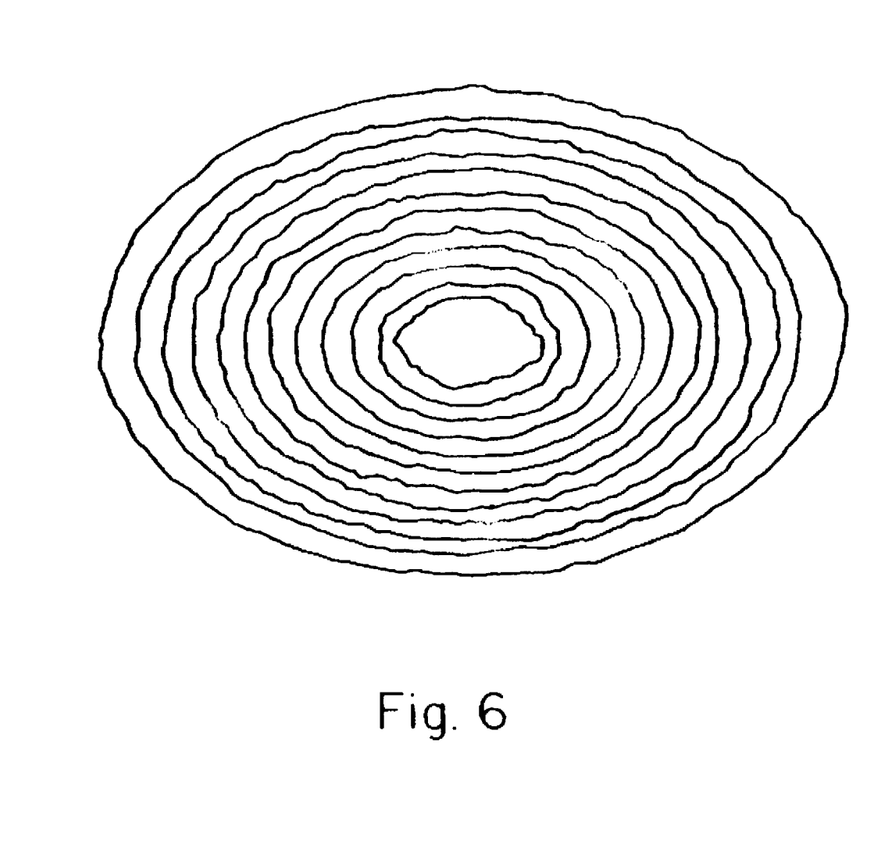
FIG. 6 is a perspective view of splines used to generate a representation of the finished surface of a spinnerette.
Figure 7:
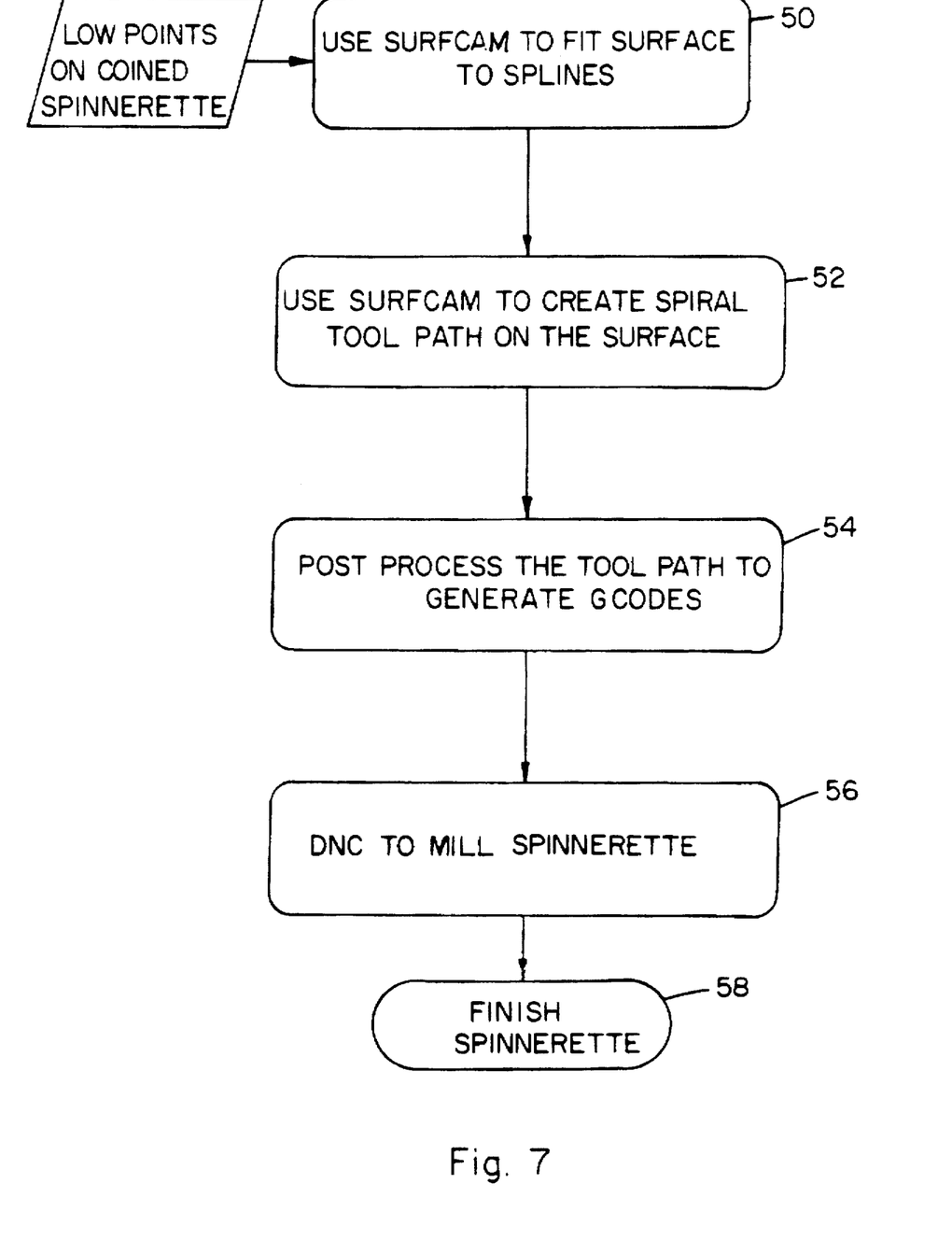

Using the pattern of pre-determined areas described above which is typically obtained beforehand, the data points obtained from the probe 30 are scanned within a 0.75 mm radius around the center of each of the predetermined areas. Any technique may be used for searching the data points stored in step 46 of FIG. 4. For example, a real-time data capture program may be used to store only points within the predetermined areas. The points received may be compared with a previously stored value (which is initialized to a very large value) and stored only if the new value has a vertical dimension lower than the previously stored value. This technique minimizes storage space, but requires a processor, either in the data processing system 34 or the data collector 36, capable of processing the data in real-time as fast as the data points are received from the probe. If a real-time data processing system is not used, the data collector 36 or memory (not separately shown) in the data processing system 34 may be used to store the data points as they are received. The data can be processed later, as illustrated in FIG. 5.

The minimum values within each of the predetermined areas constitute low points on the bumpy surface of the coined spinnerette 10. In the spinnerette example discussed above, these points can be connected by three-dimensional curves which approximate circles in the x-y plane. These curves constitute splines defining the desired finished surface of the spinnerette. A perspective view of splines for the spinnerette example which is not to scale is provided in FIG. 4. Conventional curve-fitting techniques may be used to generate equations for the splines, or commercially available programs like SURFCAM from Surfware Incorporated, San Fernando, Calif., can be used to generate a representation of the finished surface of the coined spinnerette by interpolating between the low points detected on the bumpy surface of the coined spinnerette. This operation is represented by block 50 in FIG. 7. SurfCAM is also capable of generating commands to control the milling machine 32 to move over a three-dimensional spiral path to produce the finished surface. First a generic tool path is generated 52 and then specific G-codes are generated 54 for the controller of the milling machine 32 in a post process. While SurfCAM is used as an example of how the G-codes can be produced, other generic three-dimensional milling programs are available, such as SMARTCAM.

There may be as many as 20,000 G-code instructions to mill a spinnerette like that in the example described above. Since the data storage capability of milling machine controllers is typically limited, preferably the milling machine 32 is capable of direct numerical control (DNC), so that the G-codes can be transmitted 56 directly from the data processing system 34 to the controller of the milling machine 32.

The milling operation may use a conventional tool 39, such as 0.5 inch carbide ball end mill, e.g., a Sandvik Carbide End Mill, Part number R216.44-12030-AK26L MC45. If necessary, multiple steps of machining using rough and finishing tools may be performed, in a conventional manner. In the example described above, the entire surface detection and milling process can be completed in approximately one hour. After the milling is completed, conventional broaching and any other finishing steps are performed 58.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for manufacturing spinnerettes, comprising:

means for detecting low points of a bumpy surface of a coined spinnerette;

means for generating a representation of a finished surface of the coined spinnerette by interpolating between the low points detected;

means for milling the bumpy surface of the coined spinnerette based on the representation of the finished surface of the coined spinnerette generated; and means for finishing the coined spinnerette.

2. An apparatus for smoothing a bumpy surface of a coined spinnerette, comprising:

a milling machine, selectably mounting a probe and a tool, to move either of the probe and the tool over the bumpy surface of the coined spinnerette, the probe detecting coordinates of the bumpy surface of the coined spinnerette;

a controller coupled to said milling machine to control movement of the probe along a first path substantially covering the bumpy surface of the coined spinnerette; and a data processing system, coupled to said milling machine, said controller and the probe, programmed to detect low points among the coordinates within predetermined areas on the bumpy surface of the coined spinnerette, to generate a representation of a finished surface of the coined spinnerette based on the low points, and to generate commands for said controller to move the tool along a second path based on the representation of the finished surface of the coined spinnerette.

3. An apparatus as recited in claim 2, wherein said data processing system is programmed to fit three-dimensional curves to the low points and generate the representation of the finished surface using the three-dimensional curves.

4. An apparatus as recited in claim 2, wherein the bumpy surface of the coined spinnerette has concentric rings of protuberances in a predefined pattern, and wherein said data processing system is programmed to locate the predetermined areas in two-dimensional rings adjacent at least one side of each of the concentric rings of protuberances in the predefined pattern.

5. An apparatus as recited in claim 4, wherein the predefined pattern of the concentric rings of the protuberances on the bumpy surface of the coined spinnerette uses a constant pitch for spacing between the concentric rings, and wherein said data processing system is programmed to locate each of the predetermined areas substantially equidistant from two closest protuberances in an adjacent ring having a radius and along one of an outer circle having a radius larger than the radius of the adjacent ring by approximately one-third the constant pitch, an inner circle having a radius smaller than the radius of the adjacent ring by approximately one-third the constant pitch, and an outer-most circle having a radius larger than the radius of a closest circle of the predetermined areas by approximately two-thirds of the constant pitch.

* * * * *